US010489967B2

(12) United States Patent
Smith (10) Patent No.: US 10,489,967 B2
(45) Date of Patent: Nov. 26, 2019

(54) INDEXED VALUE BLENDING FOR USE IN IMAGE RENDERING

(71) Applicant: Microsoft Technology Licensing, LLC, Redmond, WA (US)

(72) Inventor: Donald R. Smith, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 85 days.

(21) Appl. No.: 15/439,917

(22) Filed: Feb. 22, 2017

(65) Prior Publication Data

US 2018/0240267 A1 Aug. 23, 2018

(51) Int. Cl.
*G06T 15/04* (2011.01)
*G06T 15/06* (2011.01)
*G06T 15/80* (2011.01)
*G06T 15/50* (2011.01)
*G06T 15/00* (2011.01)

(52) U.S. Cl.
CPC .......... *G06T 15/503* (2013.01); *G06T 15/005* (2013.01); *G06T 15/04* (2013.01); *G06T 15/06* (2013.01); *G06T 15/80* (2013.01)

(58) Field of Classification Search
CPC .............................. G06T 11/40; G06T 15/503
See application file for complete search history.

(56) References Cited

U.S. PATENT DOCUMENTS

| 5,724,561 | A | * | 3/1998 | Tarolli | .................. | G06T 15/503 |
| | | | | | | 345/419 |
| 6,166,748 | A | * | 12/2000 | Van Hook | ............... | A63F 13/00 |
| | | | | | | 345/522 |
| 6,333,747 | B1 | | 12/2001 | Murata et al. | | |
| 6,807,620 | B1 | * | 10/2004 | Suzuoki | ................ | G06T 15/005 |
| | | | | | | 712/2 |
| 8,203,615 | B2 | | 6/2012 | Wang et al. | | |
| 9,218,689 | B1 | | 12/2015 | Baldwin | | |

(Continued)

FOREIGN PATENT DOCUMENTS

| WO | WO 99/52078 | 10/1999 |
| WO | WO 2015/061803 | 4/2015 |

OTHER PUBLICATIONS

"An exercise in modular textures—Scifi lab UDK," downloaded from http://polycount.com/discussion/89682, 27 pp. (Oct. 2011).

(Continued)

*Primary Examiner* — Jitesh Patel
(74) *Attorney, Agent, or Firm* — Klarquist Sparkman, LLP (57) ABSTRACT

Embodiments of the disclosed technology use an indexed value blending approach to compute blended values between two fixed values from a palette of base values. In one example, the disclosed technology uses a parameterized array that defines the available colors of a color palette and also orders those values so that any two values that are to be blended are located adjacent to (consecutively with) one another within the array. The array can be efficiently used to compute the necessary input values for a linear interpolation that then computes the desired blended value. For instance, the array can be used to identify a first color value and a second color value to be blended in an interpolation process as well as the degree of blending between the two (e.g., a blending control value (or alpha value)).

18 Claims, 8 Drawing Sheets

(3 of 8 Drawing Sheet(s) Filed in Color)

(56) References Cited

U.S. PATENT DOCUMENTS

| | | |
|---|---|---|
| 9,495,786 B2 | 11/2016 | Howell et al. |
| 2014/0146229 A1 | 5/2014 | Hsiao |
| 2015/0054843 A1 | 2/2015 | McDonald et al. |
| 2015/0109323 A1 | 4/2015 | Johnson et al. |
| 2015/0181158 A1 | 6/2015 | Xu et al. |
| 2016/0063676 A1 | 3/2016 | Donovan |
| 2016/0292907 A1 | 10/2016 | Burns et al. |

OTHER PUBLICATIONS

Burnes, "Rise of the Tomb Raider Graphics & Performance Guide," downloaded from http://www.geforce.com/whats-new/guides/rise-of-the-tomb-raider-graphics-and-performance-guide, 24 pp. (Jan. 2016).

"Indexed Color and Palettes," downloaded from http://www.scantips.com/palettes.html, 8 pp. (Dec. 2016).

Leong, "Project Scorpio: everything we know about Microsoft's 4K-ready Xbox," downloaded from http://www.in.techradar.com/news/gaming/Project-Scorpio-everything-we-know-about-Microsofts-4K-ready-Xbox/articleshow/52766218.cms, 9 pp. (Sep. 2016).

"PC Exclusive Star Citizen to Get Massive 8K UHD Resolution Thanks to Freedom From Consoles," downloaded from http://www.gamespot.com/forums/pc-mac-linux-society-1000004/star-citizen-to-get-massive-8k-uhd-resolution-31685156/, 18 pp. (Mar. 2016).

Smith, "Gradient Mapping—An Awesome Way to Get Cheap Variation in Textures," downloaded from http://technical-eden.blogspot.ca/2012/01/gradient-mapping-awesome-way-to-get.html, 3 pp. (Jan. 2012).

Tatarchuk, "Richer Worlds for Next Gen Games: Data Amplification Techniques Survey," *GameDevelopers Conf. Europe,* 100 pp. (Mar. 2016).

Wikipedia, "Category: TextureTechnique," downloaded from http://wiki.polycount.com/wiki/Category:TextureTechnique, 2 pp. (document marked: last modified Sep. 26, 2014).

Wikipedia, "ChannelPacking," downloaded from http://wiki.polycount.com/wiki/ChannelPacking, 6 pp. (document marked: last modified Apr. 28, 2016).

Wikipedia, "Texture atlas," downloaded from http://wiki.polycount.com/wiki/Texture_atlas, 4 pp. (document marked: last modified Sep. 7, 2016).

Wikipedia, "Texturing Tutorials," downloaded from http://wiki.polycount.com/wiki/TexturingTutorials, 9 pp. (document marked: last modified Nov. 21, 2016).

International Search Report and Written Opinion dated May 14, 2018, from International Patent Application No. PCT/US2018/017521, 14 pp.

Leroterr, "How do you Lerp light.color into multiple colors?," Unity Answers, downloaded from World Wide Web, pp. 1-4 (Jul. 2014).

\* cited by examiner

```
static type values[n];                    } 210 values[0] = A;
values[1] = B;
values[2] = C;                            } 212
values[3] = D;
. . .
values[n] = X;
```

Value = Input * (MaxRange – 1);           } 310 return lerp(colors[floor(Value)], colors[ceil(Value)], frac(Value))   } 312

FIG. 3

```
static float3 colors[4];          } 410 colors[0] = 0.0, 0.0, 1.0;    ⎫
colors[1] = 1.0, 0.0, 0.0;    ⎬ 412
colors[2] = 0.0, 1.0, 0.0;    ⎪
colors[3] = 0.0, 0.0, 1.0;    ⎭
```

Array index 420 →   0          1          2          3
Array value 422 →   0.0, 0.0, 1.0   1.0, 0.0, 0.0   0.0, 1.0, 0.0   0.0, 0.0, 1.0
Visual rep. 424 →   [0]   0.5   [1]   1.5   2.5   [2]   [3]

INDEXED VALUE BLENDING FOR USE IN IMAGE RENDERING

FIELD

This application relates generally to tools and techniques for generating material property values (e.g., color values or texturing values) for use in rendering an image in a memory efficient manner while also maintaining or enhancing detail perception in the image at any resolution.

BACKGROUND

The rendering of digital images in software applications (e.g., video games, virtual reality applications, or the like) is a processor- and memory-consuming task. Further, with display devices offering unprecedented levels of resolution and/or software applications desirably offering more infinitesimal levels of detail (especially when the application allows the end user to "zoom in" or otherwise scale a digital image), techniques for generating and rendering images with high levels of detail, texture, and realism are highly desirable.

Conventional techniques, however, often call for simply increasing the size of the underlying image or texture map, creating memory-intensive images and maps. For instance, for a software application (e.g., a video game) that is designed for rendering on a 1080p display, to convert the image and texturing data to the next resolution level (4K) involves hard-coding color or texturing values that are many multiples the size of the 1080p counterpart. Conceivably, this could result in a 20 GB software application becoming undesirably large (potentially 2× the original size or greater), resulting in a loss in memory resources that would otherwise be available. The bandwidth cost and download time of such an application is also highly undesirable, both from a developer standpoint and a consumer standpoint.

Moreover, during production, conventional techniques based on material property maps (e.g., color maps or texture maps) do not allow artists or designers to quickly and easily alter the palette of those properties. For example, if a change in color is desired, an artist will typically have to revise or redraw the color map in a separate program that is outside of the game engine's material editor.

Accordingly, there exists a significant need for easily customizable mechanisms that allow high-resolution images to be rendered efficiently, with a high level of perceived detail, and/or without creating a large memory footprint.

SUMMARY

The disclosed technology concerns methods, apparatus, and systems for generating material property values (e.g., color values or texturing values) for use in rendering an image in a memory efficient manner while also maintaining or enhancing detail perception in the image at any resolution. The disclosed methods, apparatus, and systems should not be construed as limiting in any way. Instead, the present disclosure is directed toward all novel and nonobvious features and aspects of the various disclosed embodiments, alone or in various combinations and subcombinations with one another.

Embodiments of the disclosed technology can be used to generate one or more values used in determining the final pixel values of a rendered image in a memory- and processing-efficient manner. For example, the disclosed techniques can be used to predetermine a color value, a texture value, a lighting value, or any other type of material property value used in a visual effects processing application, such as a game engine.

In one example embodiment, an image rendering engine: buffers into memory an array whose index values define a plurality of material property values; identifies a first material property value and a second material property value from the array, the first material property value and the second material property value being material property values to be blended and being adjacent to one another in the array; computes a blending control value; and computes a blended material property value between the first material property value and the second material property value, the degree of blending between the first material property value and the second material property being controlled by the blending control value.

In another example embodiment, one or more image values are computed using indexed value blending (IVB); and one or more images are rendered for display on a display device using the one or more computed image values.

In yet another embodiment, and as part of an image rendering process: an array is defined whose index values define a plurality of material property values, the material property values of the array being material property values available to be blended with one another; an input value is defined that deterministically defines two material property values of the array to be blended and a degree to which the two material property values are to be blended; and the array and the input value are stored.

The innovations can be implemented as part of a method, as part of a computing system configured to perform the method, or as part of computer-readable media storing computer-executable instructions for causing a processing device (e.g., a circuit, such as a microprocessor or microcontroller), when programmed thereby, to perform the method. The various innovations can be used in combination or separately.

The foregoing and other objects, features, and advantages of the disclosed technology will become more apparent from the following detailed description, which proceeds with reference to the accompanying figures.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

I. General Considerations

The present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the figures may not show the various ways in which the disclosed methods can be used in conjunction with other methods.

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

II. Introduction to the Disclosed Technology

Real-time rendering of high-resolution images is a demanding computational task. For example, a game engine for a typical high-resolution video game is typically tasked with generating 30 rendered frames per second, where each frame is generated in real time and where: (a) the game engine is reactive to a player's latest movement, resulting in changes to the game display and perspective; (b) the game engine's artificial intelligent (AI) component causes one or more in-game character's to be reactive to the game context and further alter the game display; (c) the game engine's physics engine computes movement in the game's characters and/or environment and provides necessary data to render those characters and/or environmental objects properly; and/or (d) numerous other computations are performed for rendering the frames and providing the desired game play experience. This computational burden can be handled by one or more processing units (e.g., a processor or processor core), one or more graphical processing units (GPUs), and/or or one or more other processing units (e.g., FPGAs, parallel processing units, or the like).

To add realism and/or fidelity to objects in a displayed image, texture maps and/or texture masks are typically applied. But with the demand for higher resolution images (such as video games being played on 4K or higher resolution display device), interpolating pixel values from lower-scale texture maps and/or texture masks results in unrealistic, cloudy, and poorly defined textures when viewed at higher resolutions. Furthermore, it is unrealistic to create higher resolution texture maps, as doing so would multiply the size of the texture maps to sizes that would consume vast amounts of memory resources and/or impractically consume visual effects artists' time. The use of color maps also creates problems when presenting images at higher resolutions. For example, "banding" artifacts often result from sampling color maps procedurally at a specific UV coordinate due to the lack of multiple samples and no interpolation between multiple values. Still further, the typical approach of using a UV color map is burdensome during the design process, as it requires an artist to edit the map in a different program outside of the game engine any time a change in color is desired. This process is not only inflexible, but is time consuming and wasteful.

Embodiments of the disclosed technology use an indexed value blending ("IVB") technique that provides a computational- and memory-efficient approach to generating images with high textural and perceptual fidelity. Indeed, the approach can be used to generate high-fidelity images at any resolution with little to no extra memory cost. Embodiments of the technology disclosed herein provide an entirely new approach to generating image values (e.g., color values, texturing values, lighting value, or other suitable material property values) and have particular application to rendering images as part of a game engine. For example, embodiments of the disclosed can be used by one or more scalers that are used in the image rendering pipeline of a game engine. The values generated by the one or more scalers can then be used in the image rendering pipeline to compute the final pixels for a rendered frame. It should be understood, however, that the disclosed technology is not limited to the context of game engines, but can be applied in multiple other scenarios where high-resolution, computationally-and-memory-efficient image rendering is desirable (e.g., medical applications, augmented reality applications, virtual reality applications, digital tours, or wide variety of other image rendering and video generation applications).

Embodiments of the disclosed IVB technology provide numerous advantages when compared to other techniques. For instance, any one or more of the following advantages can be realized in embodiments of the disclosed technology: (a) embodiments of the IVB technology are platform and engine agnostic; (b) embodiments of the IVB technology are capable of rendering high fidelity surfaces; (c) the scalability of embodiments of the IVB technology offers perceivably unlimited surface detail; (d) embodiments of the IVB technology have low GPU, CPU, and RAM resource costs; (e) embodiments of the IVB technology avoid the need for using high-cost textures or high-cost procedural textures that are costly to compute; (f) embodiments of the IVB technology can be art directed (e.g., a wide variety of color variations can be created without creating any new content;

instead an artist can just change the color parameters within the engine (without having to access or use an application outside of the engine, thus allowing for faster iterations)); (g) embodiments of the IVB technology can also be procedurally driven; (h) embodiments of the IVB technology provide per color control of material properties; (i) additional colors/values do not incur additional performance costs in embodiments of the IVB approach, only small amounts of memory; and/or (j) embodiments of the IVB technology reduce (or eliminate) "banding" effects in the rendered image because there is no compression of an underlying color map or single sampling at a UV coordinate of the color map.

III. Example Computing Environments

Figure 1:
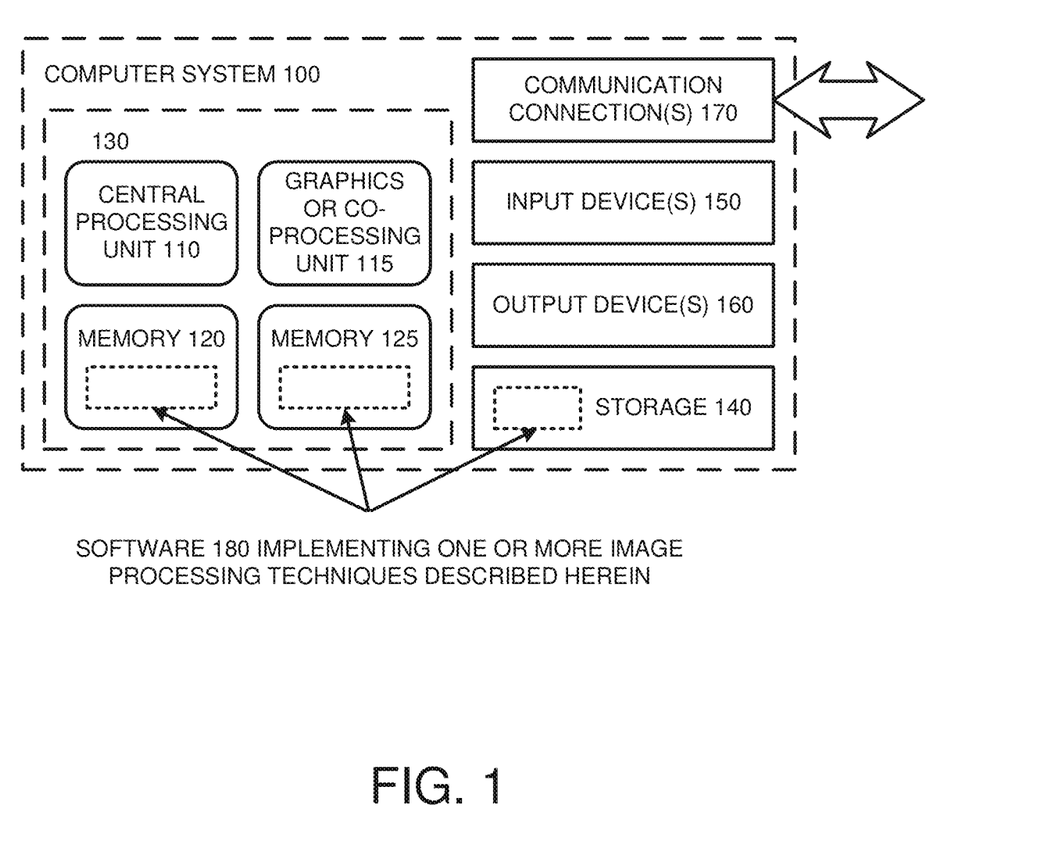
FIG. 1 illustrates a generalized example of a suitable computer system in which the described innovations may be implemented.

FIG. 1 illustrates a generalized example of a suitable computer system 100 in which the described innovations may be implemented. The example computer system 100 can be a server or computer workstation (e.g., PC, laptop, tablet computer, mobile device, or the like) used by an artist or designer during the design and production of digital media (e.g., a video game) or be the target endpoint device where the digital media is rendered and displayed (e.g., a gaming console, PC, laptop, tablet computer, mobile device, or the like).

With reference to FIG. 1, the computer system 100 includes one or more processing devices 110, 115 and memory 120, 125. The processing devices 110, 115 execute computer-executable instructions. A processing device can be a general-purpose CPU, GPU, processor in an ASIC, FPGA, or any other type of processor. In a multi-processing system, multiple processing units execute computer-executable instructions to increase processing power. For example, FIG. 1 shows a CPU 110 as well as a GPU or co-processing unit 115. The tangible memory 120, 125) may be volatile memory (e.g., registers, cache, RAM), non-volatile memory (e.g., ROM, EEPROM, flash memory, NVRAM, etc.), or some combination of the two, accessible by the processing device(s). The memory 120, 125 stores software 180 implementing one or more innovations described herein, in the form of computer-executable instructions suitable for execution by the processing device(s).

The computer system 100 may have additional features. For example, the computer system 100 includes storage 140, one or more input devices 150, one or more output devices 160, and one or more communication connections 170. An interconnection mechanism (not shown) such as a bus, controller, or network interconnects the components of the computer system 100. Typically, operating system software (not shown) provides an operating environment for other software executing in the computer system 100, and coordinates activities of the components of the computer system 100.

The tangible storage 140 may be removable or non-removable, and includes magnetic disks, magnetic tapes or cassettes, optical storage media such as CD-ROMs or DVDs, or any other medium which can be used to store information and which can be accessed within the computer system 100. The storage 140 stores instructions for the software 180 implementing one or more innovations described herein.

The input device(s) 150 may be a touch input device such as a keyboard, mouse, pen, or trackball, a voice input device, a scanning device, or another device that provides input to the computer system 100. For video or image input, the input device(s) 150 may be a camera, video card, TV tuner card, screen capture module, or similar device that accepts video input in analog or digital form, or a CD-ROM or CD-RW that reads video input into the computer system 100. The output device(s) 160 include a display device. The output device(s) may also include a printer, speaker, CD-writer, or another device that provides output from the computer system 100.

The communication connection(s) 170 enable communication over a communication medium to another computing entity. For example, the communication connection(s) 170 can connect the computer system 100 to the internet and provide the functionality described herein. The communication medium conveys information such as computer-executable instructions, audio or video input or output, image data, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations presented herein can be described in the general context of computer-readable media. Computer-readable media are any available tangible media that can be accessed within a computing environment. By way of example, and not limitation, with the computer system 100, computer-readable media include memory 120, 125, storage 140, and combinations of any of the above. As used herein, the term computer-readable media does not cover, encompass, or otherwise include carrier waves or signals per se.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a GPU, or a programmable logic device ("PLD") such as a field programmable gate array ("FPGA")) specially designed or configured to implement any of the disclosed methods.

IV. Example Embodiments of Indexed Value Blending

Embodiments of the disclosed technology can be used to generate one or more values used in determining the final pixel values of a rendered image in a memory- and processing-efficient manner. For example, the disclosed techniques can be used to determine a color value, a texture value, a lighting value, or any other type of material property or other value used in a visual effects processing application, such as a game engine. The example embodiments below are described with reference to methods for blending two color values, but it should be understood that the disclosed techniques can be more generally used in other contexts. For instance the disclosed techniques can be used to determine one or more lighting values (such as a specular reflection coefficient, a diffuse light value, a roughness value, an ambient occlusion value, a reflectivity value, and the like), texture values for a texture map (such as a bump map, normal map, and the like), or any value utilized during rendering of an object (e.g., any other material property value used by a shader). The input values used in example embodiments of the disclosed technology can also vary. For instance, the input value may be sampled from textures (such as from a bump map, normal map, and the like).

Embodiments of the disclosed technology use an indexed value blending approach to compute blended values between two fixed values from a palette of base values. In the context of determining colors for a color map, the disclosed technology uses a parameterized array that defines the available colors of the color palette and also orders those values so that any two values that are to be blended are located adjacent to (consecutively with) one another within the array. This property of the array allows for the array to be efficiently used to compute the necessary input values for a linear interpolation that then computes the desired blended value. The array can be used to efficiently identify a first color value and a second color value to be blended in an interpolation process as well as the degree of blending between the two (e.g., a blending control value (or alpha value)).

Figure 2:
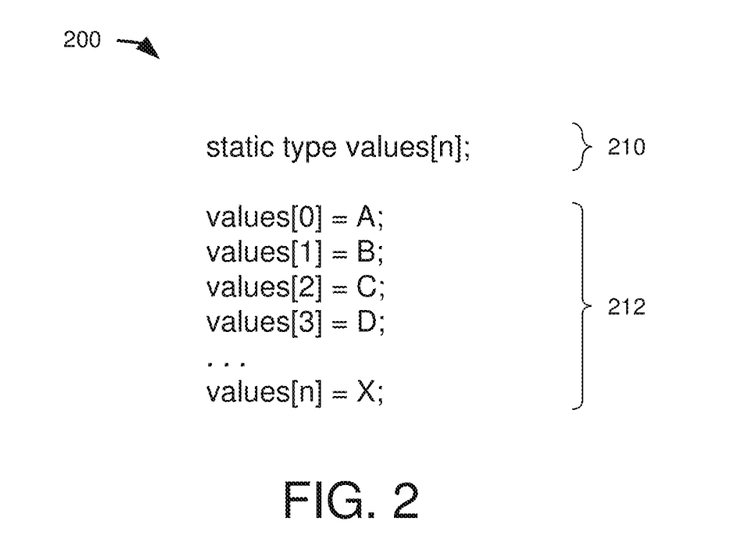
FIG. 2 shows example code for generating an array to be used in embodiments of the indexed value blending approach described herein.

FIG. 2 shows example code 200 for generating an array to be used in an example embodiment of the indexed value blending approach described herein. The disclosed example is shown in high-level shading language (HLSL), though any suitable computing or shader language can be used to define and/or generate the array.

In FIG. 2, the array is an n-dimensional array of values of some specified "type", and the variables A, B, C, . . . X represent the values of the array. For instance, in certain embodiments, the variables A, B, C, . . . X are 3-vector floating-point color values in a desired color space (e.g., RGB, YUV, or other color format). Additionally, lines 210 define the name of the array as "values" and assigns the size of the array as being "n", where n is any positive integer value. Lines 212 assign values to the array indexes 0, 1, 2, . . . n. In FIG. 2, these values are represented as variables A, B, C, . . . X, but represent the values to be blended. For instance, the variables could represent color values using 3-vector floating point format ("float3"). For example, if color "A" is desired to be pure red, the actual float3 value for "A" would be "1.0, 0.0, 0.0", and if color "B" is desired to be pure green, the actual float3 value for "B" would be "0.0, 1.0, 0.0", and if color "C" is desired to be pure blue, the actual float3 value for "C" would be "0.0, 0.0, 1.0" in accordance with certain embodiments of the disclosed technology.

More generally, the defined array represents the available "palette" of base values for use in generating the desired value, and thus may include numerous entries (e.g., floating point values of x, y, z, where any one or more of x, y, z are values between 0 and 1). Still further, the defined array comprises adjacent values that are to be blended; thus, the array may include repeated index values in order to create all of the desired blended values.

Figure 3:
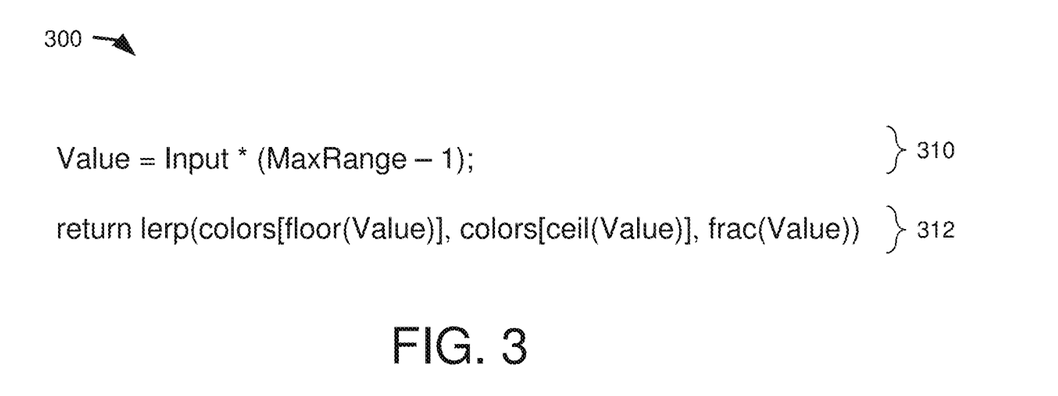
FIG. 3 shows example code for performing an example embodiment of the indexed value blending technique using a defined array (e.g., an array as defined in FIG. 2).

FIG. 3 shows example code 300 for performing an example embodiment of the blending technique using a defined array (e.g., an array as defined in FIG. 2). The disclosed example is shown in high-level shading language (HLSL), though any suitable computing or shader language can be used to define and/or generate the array.

At 310, a value (e.g., a single value) is determined that is used to identify two values to be blended and also to identify a blending control value that identifies the relative distance between the two values to be blended that should be output. The blending control value is sometimes referred to as the "alpha value" that is part of the input of a linear interpolation function (e.g., the lerp function). The value determined at 312 is sometimes referred to as the "indexed value blending input value" or "IVB input value". As shown at 310, the value is determined as follows:

$$\text{Value} = \text{Input} \times (\text{MaxRange} - 1), \quad (1)$$

where "Value" corresponds to the IVB input value, "Input" corresponds to a value that defines the desired color to be produced, and "MaxRange" corresponds to the number of indices in the array (e.g., the value n from the array definition of FIG. 2). In more detail, and in some embodiments, the term "Input" is a greyscale value that is painted by the artist (e.g., using a game engine's tools for altering the color, texture, and/or lighting map). This value may be further modulated by a variance mask tiled across a surface to give added realism. The variance mask, in turn, can be painted by an artist or generated procedurally.

At 312, a linear interpolation function is performed using input values that are determined directly from the IVB input value ("Value"). In particular, the linear interpolation function (e.g., the "lerp" function) uses three input values—all of which are directly determinable by applying the IVB input value to the array of FIG. 2. In the example of determining a color value, for instance, the IVB input value is used to determine: a first color (e.g., by identifying the "floor" of the "Value" through the "floor(x)" function, which rounds down to the nearest index value of the array); a second color to be blended with the first color (e.g., by identifying the "ceiling" of the "Value" through the "ceil(x)" function, which round up to the nearest index value of the array); and a blending control (or alpha) value (e.g., by identifying the fractional value of the input value using the "frac(x)" function).

More generally, the code at 312 can be viewed as returning the linear interpolation between the two nearest adjacent values (e.g., color values) to the IVB input value in the array while also using the fractional value of the IVB input value as the distance between the two values to be returned by the linear interpolation (the degree of blending to be performed between the two values). Notably, this approach to identifying the two values to blend as well as the blending control (or alpha) value is highly efficient in terms of GPU, CPU, and memory demand. Furthermore, the approach can be implemented by a shader (e.g., a custom shader compiled to implement HLSL code) of a game engine, which allows for the values of the array to be quickly and easily altered "in-engine" during design and production without having to create UV color maps. The approach can also be performed by a module other than the shader, such as a module contributing to the image rendering pipeline and written in any suitable computer language (e.g., C++ or the like).

The example code of FIGS. 2 and 3 can be used together, for example, in two distinct product stages: (1) during product design and development; and (2) in the final product. For instance, in the product design and development stage, an artist or designer (e.g., an artist or designer for a video game) can create the array of FIG. 2 as part of a custom shader (or node that is compiled as a shader) that is used as part of a game engine's user interface (e.g., the engine's material editor). Such custom shaders (e.g., that can be defined using HLSL) are common in a wide variety of game engines, such as the Unreal Engine® game engine available from Epic Games. Thus, the designer has control over the size of the array as well as the individual index values of the array. For instance, the designer can create the array to correspond to the desired color palette for a game object, and easily modify them as part of the shader node. The code of FIG. 3 follows the code of FIG. 2 and can also be included in a custom shader (or node). Further, and as explained above, the designer has control over the greyscale value (the "input" value) that is ultimately used to determine the IVB input value. Once the designer is satisfied with the array and greyscale input value, those values can then be stored as part of the game engine's executable code that is ultimately part of the final product (e.g., the deliverable video game).

Then, in the second stage, and during actual execution of the executable code (e.g., at a user's gaming console, mobile device, PC, laptop, tablet computer, or other endpoint device), the game engine will execute the code performing the IVB technique (e.g., by a shader) as part of its image rendering pipeline for rendering an object within a frame of a game image. This will typically include buffering into memory the array defined by the designer as well as employing the interpolation technique disclosed in FIG. 3. A GPU or CPU of the user's device may be responsible for implementing the technique (e.g., using a customized shader). Notably, because the interpolation is desirably executed at a high-frame rate (e.g., 30 frames per second or higher), the efficient design and low memory overhead of the IVB technique provides numerous benefits, including significantly reducing the size of the executable code (thereby reducing the memory overhead necessary to store and execute the technique) as well as improving the computational efficiency of the computing resources (e.g., GPUs, CPUs, and/or RAM) called on to implement the IVB technique.

Figure 4:
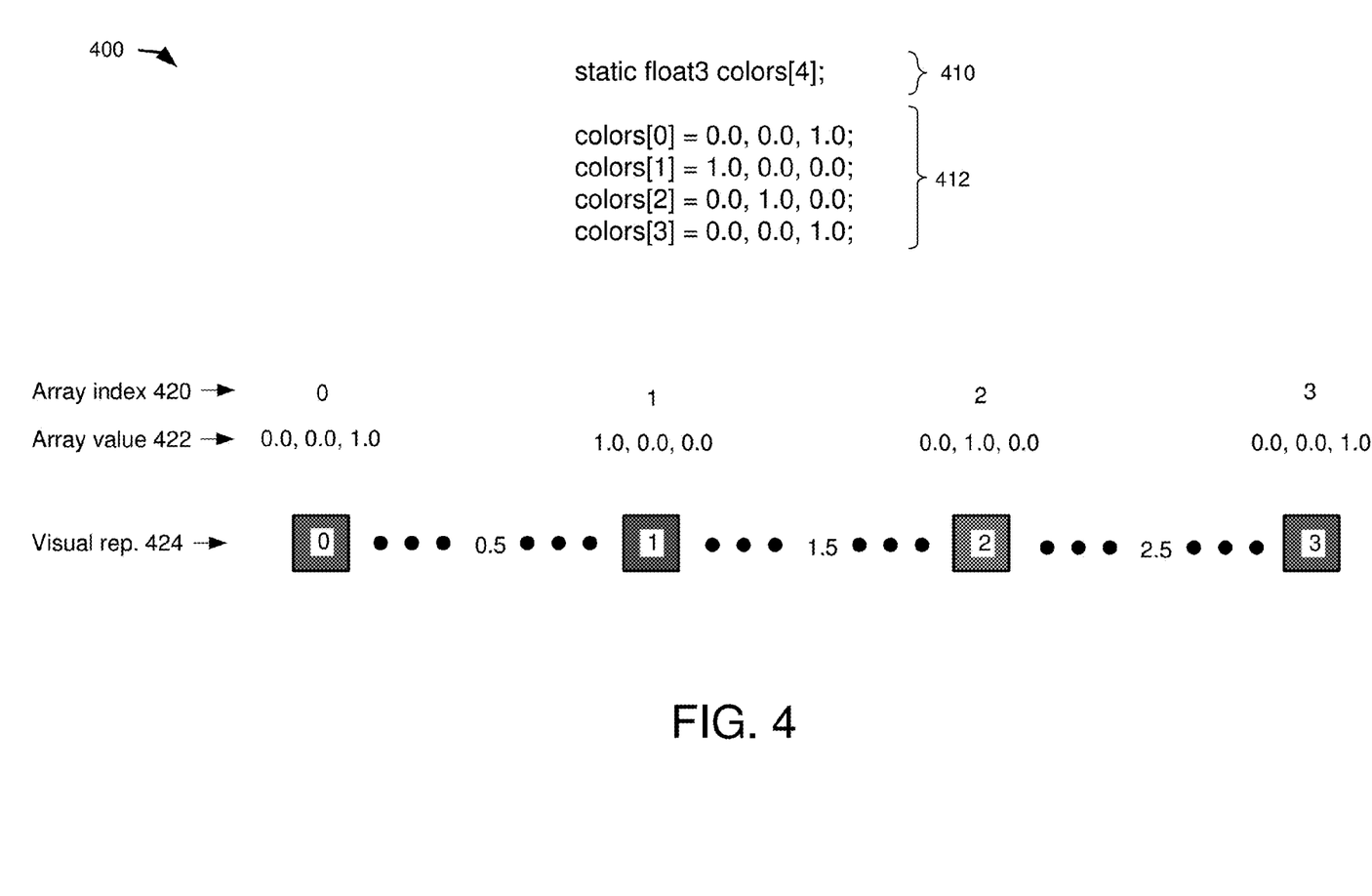
FIGS. 4 and 5 are schematic block diagrams that illustrate the indexed value blending technique by way of example.
Figure 5:
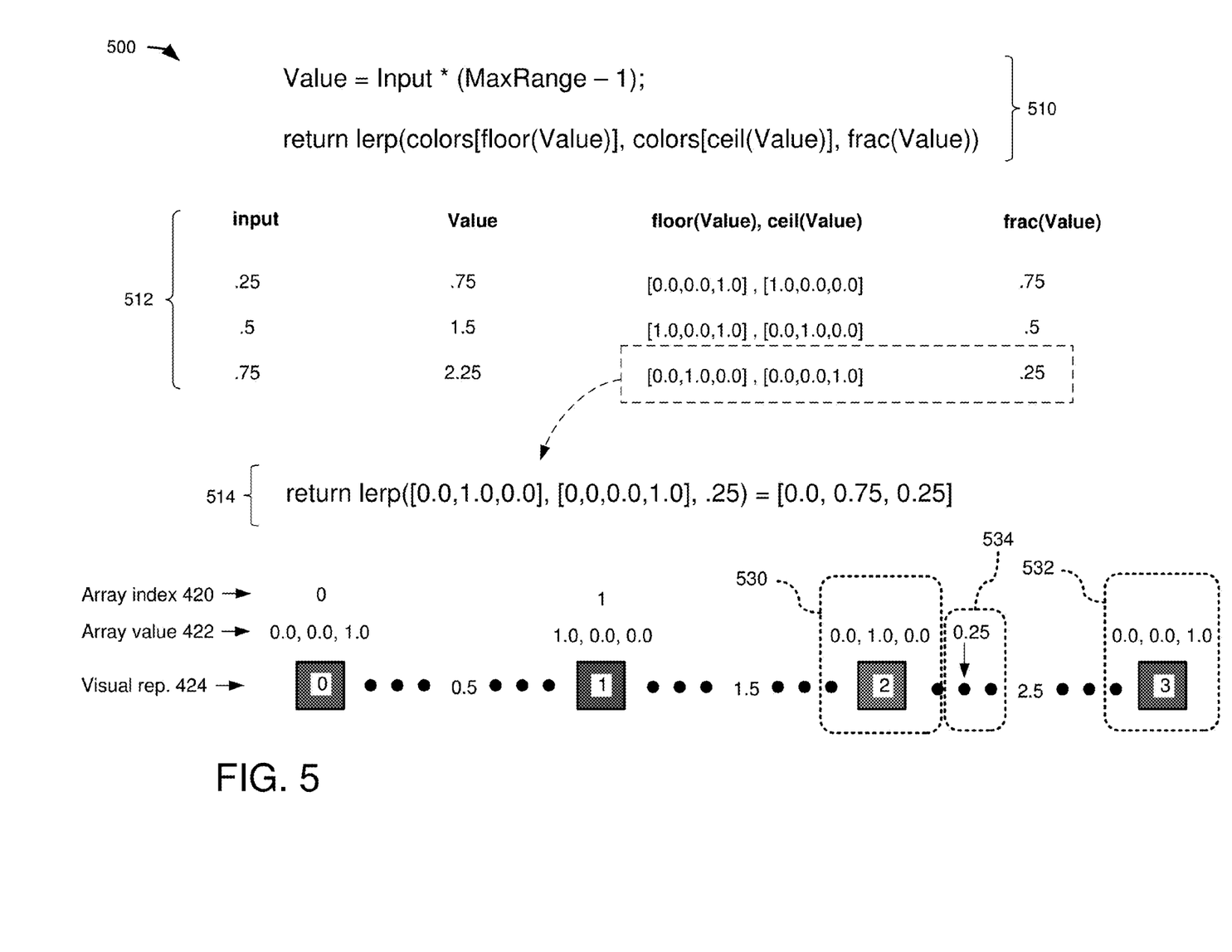

FIGS. 4 and 5 are schematic block diagrams 400 and 500 that illustrate the indexed value blending technique by way of example. The example shown in FIGS. 4 and 5 is not to be construed as limiting, as it is provided here for illustrative purposes only. It will be readily understood that the size of the array, the index values of the array, and/or the IVB input value will vary from implementation to implementation.

In this example, the IVB array is defined to have four colors in the following order: blue, red, green, blue. These values reflect the designer's desire to create blended colors of one of: blue with red, red with green, and green with blue. With this in mind, and turning to FIG. 4, code 410 defines the array as having four index values labeled "colors", and code 412 defines those index values in float3 format using the corresponding floating point RGB values. Array index 420 and array value 422 illustrate the defined indices and index values.

Visual representation 424 also illustrates the contents of the array but overlays the array values along a line that proceeds from 0 to 3. This linear visualization helps illustrate the operation of the IVB technique and some of the concepts that underlie the technique.

Schematic block diagram 500 of FIG. 5 illustrates the use of the defined array from FIG. 4 in an example embodiment of the IVB technique. Code 510 repeats the code of FIG. 3. Table 512 illustrates the application of the code 510 to three example input values of 0.25, 0.5, and 0.75, respectively. In particular, table 512 shows the resulting IVB input value ("Value"), floor and ceiling values ("floor(Value), ceil (Value)"), and the fractional value ("frac(Value)") for each example input value. Furthermore, at 514, FIG. 5 shows the application of the linear interpolation function ("lerp") for the example input value of 0.75, which results in a blended value of "0.0, 0.75, 0.25".

FIG. 5 also shows the array index 420, array value 422, and visual representation 424 of FIG. 4 but highlights how the floor value corresponds to a first color from the array (shown at 530), how the ceiling value corresponds to a second color from the array (shown at 532) and the fractional value corresponds to a point between the two representative of the desired blending amount (shown at 534). The linearity of the visual representation 424 thus illustrates how the IVB technique can be conceptually viewed as a technique that identifies a point along a linear color gradient but that (a) does not actually use an underlying gradient and instead uses a low-memory array of base colors to be blended; and (b) allows for the color palette to be easily directed by changing the array without the need to alter any underlying texture map.

In some cases, the example IVB technique illustrated in FIGS. 4 and 5 and described in more detail above results in not needing to interpolate between more than two colors to produce the pixel having a desired texture, color, opacity, etc. This produces significant savings in production time, rendering, performance and visual fidelity (e.g., 16-bit or greater textures with perceivably infinite detail). Further, the technique is scalable to 4 k resolution, 8 k resolution, or beyond.

Figure 9:
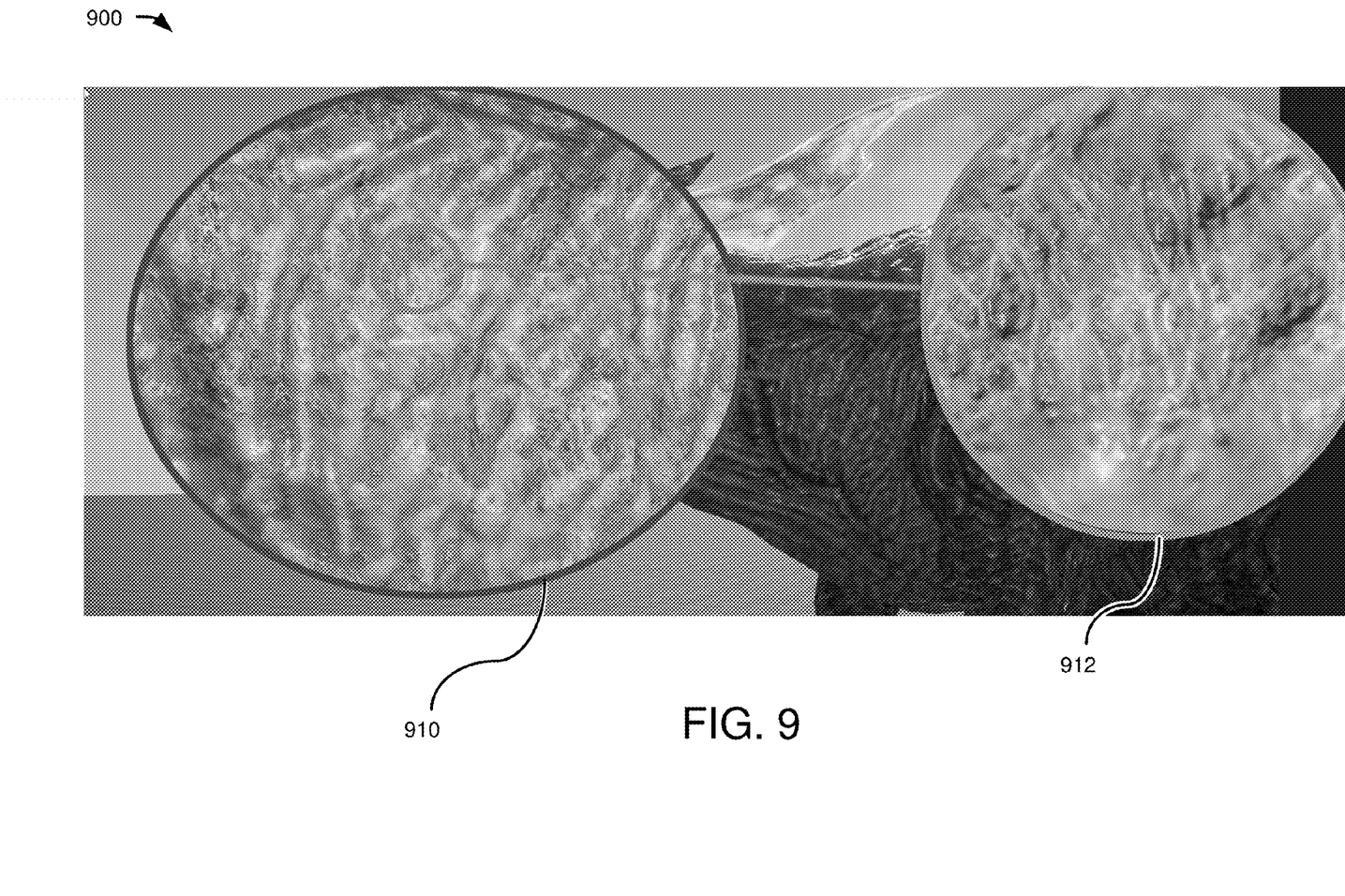
FIG. 9 is an image showing an example frame rendered using an embodiment of the disclosed technology with multiple levels of zooming-in for a specified portion.

FIG. 9 is an image 900 showing a frame rendered using an embodiment of the disclosed technology at multiple levels of zooming in at a specific portion, but with all pixel values being present in the original image. In this example, the image is presented in 4K resolution, and shows how the disclosed technology produces high-fidelity images with highly realistic textures. The overall image 900 is a 4K image of a dragon character generated by a game engine producing material properties using the IVB technique. The two progressively zoomed-in portions 910, 912, illustrate how the disclosed IVB technology produces superior levels of detailed textures and lighting effects, even when viewed up close.

Figure 6:
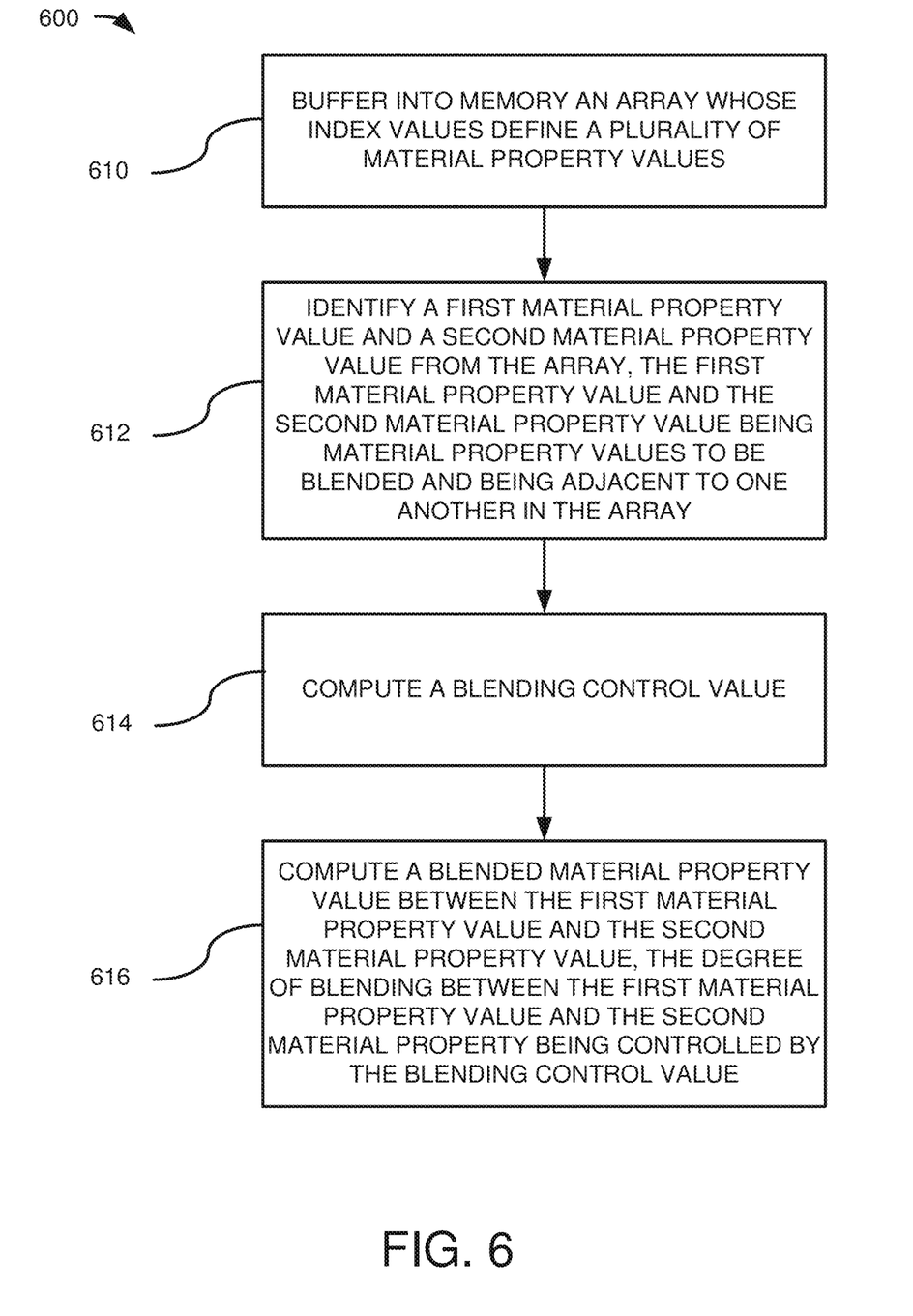
FIG. 6 is a flow chart showing one example method for rendering an image using embodiments of the disclosed technology.

FIG. 6 is a flow chart 600 showing one example method for rendering an image using embodiments of the disclosed technology. In FIG. 6, the method is performed by a computing device implementing an image rendering tool (e.g., a game engine configured to render images in real time during game play at a specified frame rate, such as 28 frames per second, 30 frames or second, or greater). The computing device can be a mobile device, PC, laptop, tablet, or the like. In certain example implementations, the embodiment of FIG. 6 can be performed by a shader of an image rendering engine being executed on a processing device. Alternatively, it can be performed by a separate module (e.g., a C++ executable or other code for computing material property values that are then input into the image rendering process). Further, any of the disclosed methods or method acts can be performed with any other methods or method acts disclosed herein.

At 610, an array is buffered into memory. In this example, the array has index values that define a plurality of material property values. In certain implementations, the material property values are one of a color value, a lighting value, or a texture value At 612, a first material property value and a second material property value are identified from the array. In this example, the first material property value and the second material property value are material property values to be blended and/or are adjacent to one another in the array. In some examples, identifying the first material property value and the second material property value comprises computing an indexed value blending (IVB) input value that controls the identification of the first material property value, the second material property value, and the blending control value. The IVB input value can be based, for instance, at least in part on the size of the array. Further, in some examples, the identifying comprises identifying the nearest two index values of the array to the IVB input value.

At 614, a blending control value is computed. In some examples, the computing the blending control value comprises computing a fractional value of the IVB input value.

At 616, a blended color value between the first color value and the second color value is computed. In this example, the degree of blending between the first color value and the second color is controlled by the blending control value. In some examples, the computing the blended color value comprises performing a linear interpolation between the first color value and the second color value. In some implementations, one or more images are rendered using the blended color value.

In some implementations, the image rendering process is performed by a game engine configured to render frames of a video game during execution of the game. Still further, in some implementations, the blended color value is for an image having a resolution of 1080p, 4K, or higher.

Figure 7:
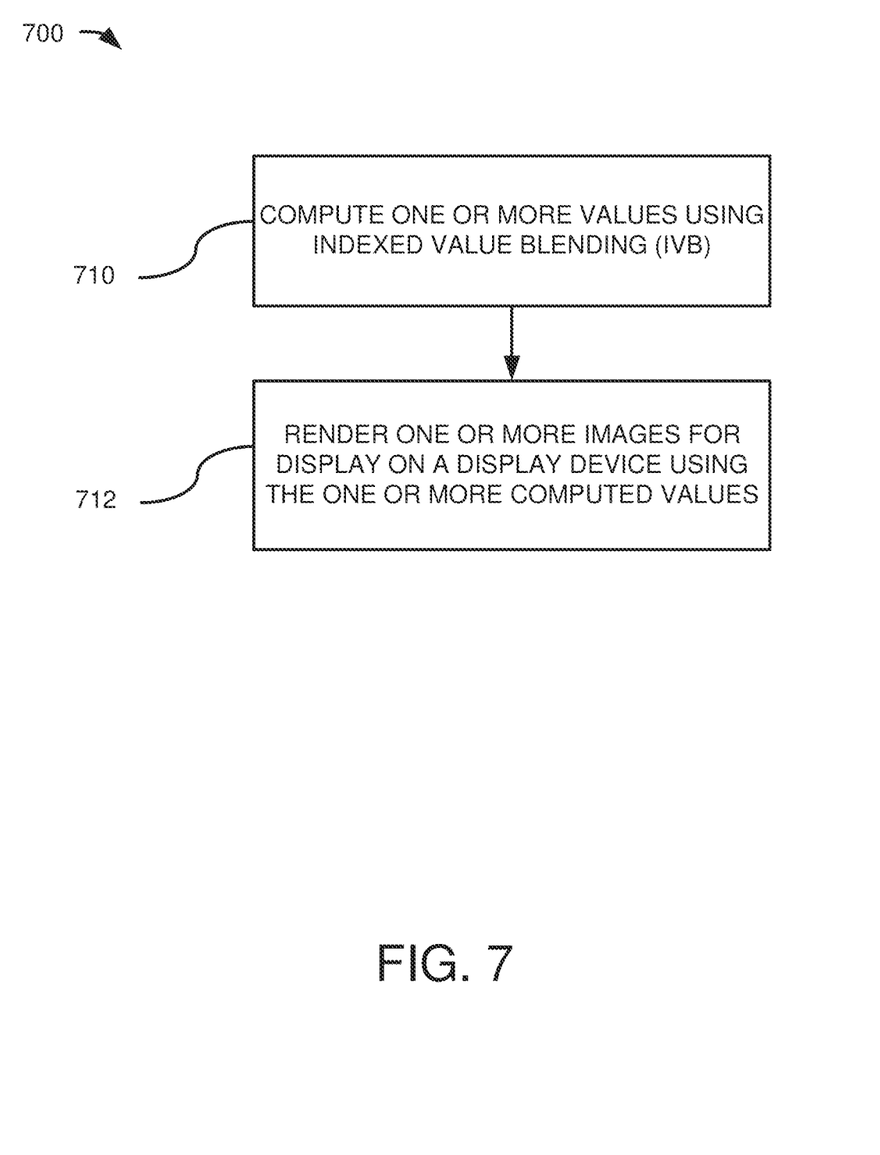
FIG. 7 is a flow chart showing another example method for rendering an image using embodiments of the disclosed technology.

FIG. 7 is a flow chart 700 showing another example method for rendering an image using embodiments of the disclosed technology. In FIG. 7, the method is performed by a computing device implementing an image rendering tool (e.g., a game engine configured to render images in real time during game play at a specified frame rate, such as 28 frames per second, 30 frames per second, or greater). The computing device can be a mobile device, PC, laptop, tablet, or the like. In particular example implementations, the embodiment of FIG. 7 can be performed by a shader of an image rendering engine being executed on a processing device. Alternatively, it can be performed by a separate module (e.g., a C++ executable or other code for computing material property values that are then input into the image rendering process). Further, any of the disclosed methods or method acts can be performed with any other methods or method acts disclosed herein.

At 710, one or more values are computed using indexed value blending (IVB). The values can be, for example, color values, lighting values, texture values, variance map values, or the like. For example, in one embodiment, the one or more values are computed by computing an IVB input value, using the IVB input value to identify: (a) a first value, (b) a second value to be blended with the first value, and (c) a blending control value, and computing a blended value between the first value and the second value in accordance with the blending control value. In some implementations, the first value and the second value are identified using an array defining a plurality of value to be blended with one another, the first value is identified by determining a nearest array index value that is lesser than the IVB input value, and the second value is identified by identifying a nearest array index value that is greater than the IVB input value. Further, in some implementations, the computing the IVB input value comprises multiplying a greyscale input value by a value defined by the size of the array. In general, the array can be sampled at any point as specified by "maxrange" and can be offset by a value indicating the desired first index of the array At 712, one or more images are rendered for display on a display device using the one or more computed values. For instance, the blended value can be a color value, a lighting value, or a texture value that used during rendering to generate final pixel values for a frame that is then displayed.

In some embodiments, the computing of the one or more image texturing values is performed by a customized shader, and the computing and the rendering are performed by a game engine configured to render frames in real time during game play.

Figure 8:
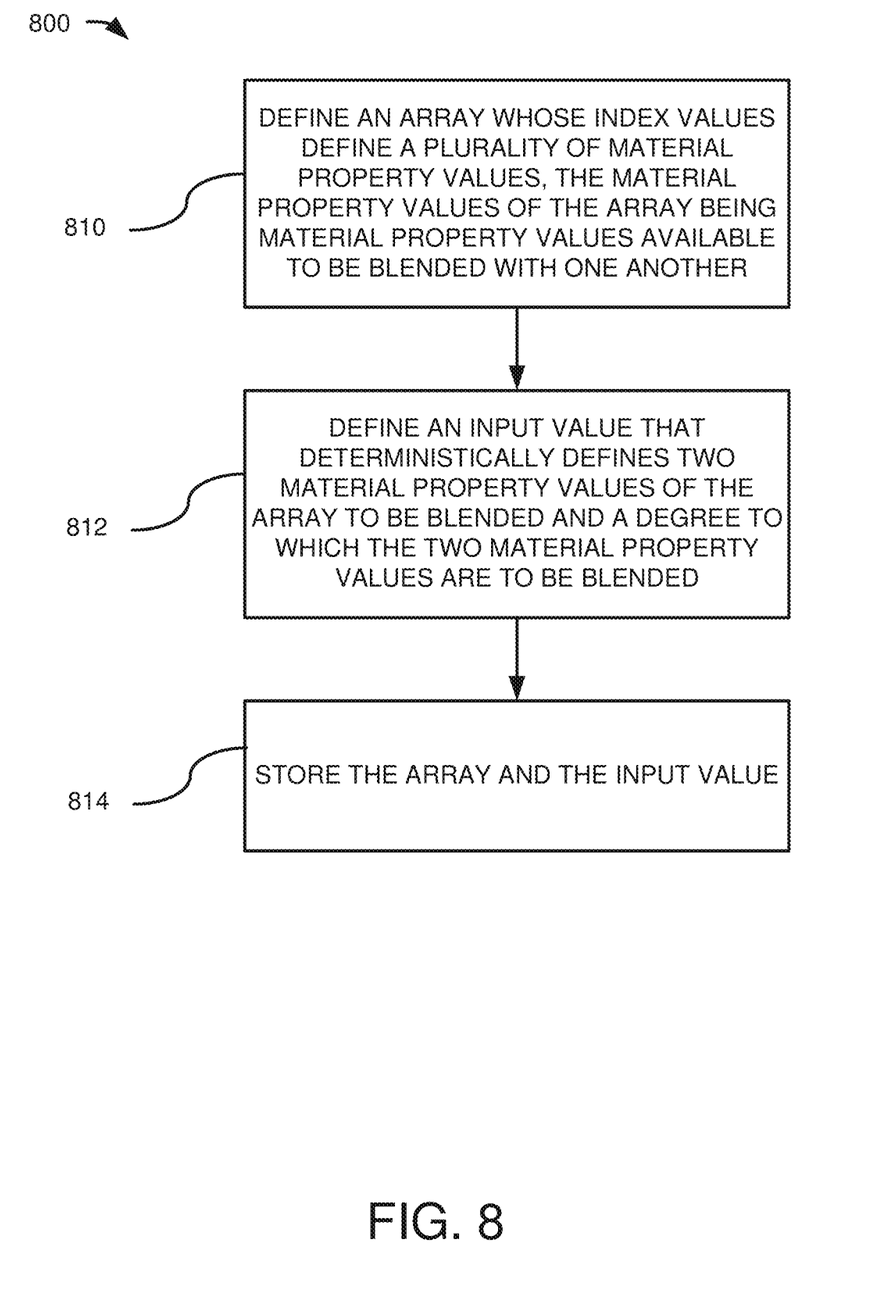
FIG. 8 is a flow chart showing another example method of performing indexed value blending in accordance with an embodiment of the disclosed technology.

FIG. 8 is a flow chart 800 showing another example method of performing indexed value blending in accordance with an embodiment of the disclosed technology. In FIG. 8, the method is performed by a computing device implementing an image rendering tool during the design stage of the image (e.g., by a material editor of a game engine configured to allow designers and artists to create object instances and apply texturing to the objects). For example, the method of FIG. 8 can be performed by a computing device being operated by a video game artist or design during the design and development stage of the video game. The image rendering tool can be configured to create executable code implementing a game engine that includes an image rendering process (e.g., to render images during game play in accordance with an IVB technique as disclosed herein). Such tools include a variety of game engines, like the Unreal Engine® game engine available from Epic Games. The computing device can be a mobile device, PC, laptop, tablet, or the like. In particular example implementations, the embodiment of FIG. 8 can be performed by a shader of an image rendering engine being executed on a processing device. Alternatively, it can be performed by a separate module (e.g., a C++ executable or other code for computing material property values that are then input into the image rendering process). Further, any of the disclosed methods or method acts can be performed with any other methods or method acts disclosed herein.

At 810, an array is defined whose index values define a plurality of material property values, the color values of the array being material property values available to be blended with one another. In certain implementations, the two material property values of the array to be blended are adjacent to one another.

At 812, an input value is defined that deterministically defines two material property values of the array to be blended and a degree to which the two material property values are to be blended.

At 814, the array and the input value are stored. For example, the array and the input value can be compiled into executable code and stored. Further, the executable code can implement a shader that uses the input value to linearly interpolate a blended material property value between two material property values of the array according to a fractional value determined from the input value.

In certain implementations, the array and the input value are defined within a user interface of a game engine, and the index values of the array are modifiable within the user interface without altering a separate material property map (e.g., a color map) generated outside of the user interface.

V. Concluding Remarks

In view of the many possible embodiments to which the principles of the disclosed invention may be applied, it should be recognized that the illustrated embodiments are only preferred examples of the invention and should not be taken as limiting the scope of the invention.

What is claimed is:

1. A method, comprising:
as part of an image rendering process being executed on a processing device:
buffering into memory an array whose index values define a plurality of material property values;
identifying a first material property value and a second material property value from the array, the first material property value and the second material property value being material property values to be blended and being adjacent to one another in the array;
computing a blending control value; and
computing a blended material property value between the first material property value and the second material property value, the degree of blending between the first material property value and the second material property being controlled by the blending control value,
wherein the method is performed by a shader of a game engine, and wherein the blended material property value is for an image having a resolution of 1080p, 4K, or higher.

2. The method of claim 1, further comprising computing an indexed value blending (IVB) input value that controls a. the identification of the first material property value, b. the second material property value, and c. the blending control value.

3. The method of claim 2, wherein the IVB input value is based at least in part on a size of the array.

4. The method of claim 2, wherein the identifying the first material property value and the second material property value comprises identifying a nearest two index values in the array to the IVB input value.

5. The method of claim 2, wherein the computing the blending control value comprises computing a fractional value of the IVB input value.

6. The method of claim 1, wherein the computing the blended material property value comprises performing a linear interpolation between the first material property value and the second material property value.

7. The method of claim 1, further comprising rendering one or more images using the blended material property value.

8. The method of claim 1, wherein the material property values are one of a color value, a lighting value, or a texture value.

9. One or more computer-readable storage devices or memories storing computer-executable instructions, which when executed by a computer cause the computer to perform a method, the method comprising:
computing one or more values using indexed value blending (IVB); and
rendering one or more images for display on a display device using the one or more computed values,
wherein the method is performed by a shader of a game engine, and wherein the blended material property value is for an image having a resolution of 1080p, 4K, or higher.

10. The one or more computer-readable storage devices or memories of claim 9, wherein the computing the one or more values comprises:
computing an IVB input value;
using the IVB input value to identify a first value, a second value to be blended with the first value, and a blending control value.

11. The one or more computer-readable storage devices or memories of claim 10, wherein the first value and the second value are identified using an array defining a plurality of values to be blended with one another, wherein the first value is identified by identifying a nearest array index value that is lesser than the IVB input value, and wherein the second value is identified by identifying a nearest array index value that is greater than the IVB input value.

12. The one or more computer-readable storage devices or memories of claim 10, wherein the computing the IVB input value comprises multiplying a greyscale input value by a value defined by a size of the array.

13. The one or more computer-readable storage devices or memories of claim 9, wherein the computing and the rendering are performed in real time during game play.

14. The one or more computer-readable storage devices or memories of claim 9, wherein a blended value is a color value, a lighting value, or a texture value used during rendering to generate final pixel values for display.

15. A system, comprising:
a computing device comprising a memory and one or more processors, the one or more processors being programmed to generate executable code for implementing an image rendering process by:
defining an array whose index values define a plurality of material property values, the material property values of the array being material property values available to be blended with one another;
defining an input value that deterministically defines two material property values of the array to be blended and a degree to which the two material property values are to be blended; and
storing the array and the input value,
wherein the defining the array and the defining the input value are performed within a user interface of a game engine, and wherein the index values of the array are modifiable within the user interface without altering a separate material property map generated outside of the user interface.

16. The system of claim 15, wherein the image rendering process is part of a game engine rendering images during game play.

17. The system of claim 15, wherein the executable code uses the input value to linearly interpolate a blended material property value between the two material property values of the array according to a fractional value determined from the input value.

18. The system of claim 15, wherein the two material property values of the array to be blended are adjacent to one another in the array.

* * * * *